United States Patent
Boone et al.

(10) Patent No.: US 7,361,053 B1
(45) Date of Patent: Apr. 22, 2008

(54) NETWORK ELEMENT CONNECTOR ASSEMBLY INCLUDING STACKED CONNECTOR INTERFACES

(75) Inventors: Earl W. Boone, Round Rock, TX (US); James W. Edwards, III, Austin, TX (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 10/862,936

(22) Filed: Jun. 8, 2004

Related U.S. Application Data

(63) Continuation-in-part of application No. 10/758,653, filed on Jan. 15, 2004, now Pat. No. 7,255,488.

(51) Int. Cl.
*H01R 13/66* (2006.01)
*H01R 13/60* (2006.01)

(52) U.S. Cl. .................................................. 439/541.5

(58) Field of Classification Search ................ 439/577, 439/620, 490, 676, 541.5, 540.1
See application file for complete search history.

(56) References Cited

U.S. PATENT DOCUMENTS

| | | | | |
|---|---|---|---|---|
| 5,366,388 | A * | 11/1994 | Freeman et al. | 439/540.1 |
| 5,419,717 | A * | 5/1995 | Abendschein et al. | 439/577 |
| 6,244,896 | B1 * | 6/2001 | Boutros | 439/541.5 |
| 6,600,865 | B2 * | 7/2003 | Hwang | 385/134 |
| 6,692,159 | B2 * | 2/2004 | Chiu et al. | 385/53 |
| 7,070,446 | B2 * | 7/2006 | Henry et al. | 439/541.5 |
| 2005/0063647 | A1 * | 3/2005 | Thronton et al. | 385/89 |

* cited by examiner

*Primary Examiner*—Javaid H. Nasri
(74) *Attorney, Agent, or Firm*—Campbell Stephenson LLP

(57) ABSTRACT

A network element connector assembly including stacked connector interfaces is disclosed. According to one embodiment, an apparatus is provided which includes a first connector interface to couple a first network connector with a mounting surface and a second connector interface to couple a second network connector with the mounting surface, where the first connector interface and second connector interface are vertically aligned with one another with respect to the mounting surface, the first connector interface includes a fixed connector interface module, and the second connector interface includes an aperture to receive a removable connector interface module.

31 Claims, 4 Drawing Sheets

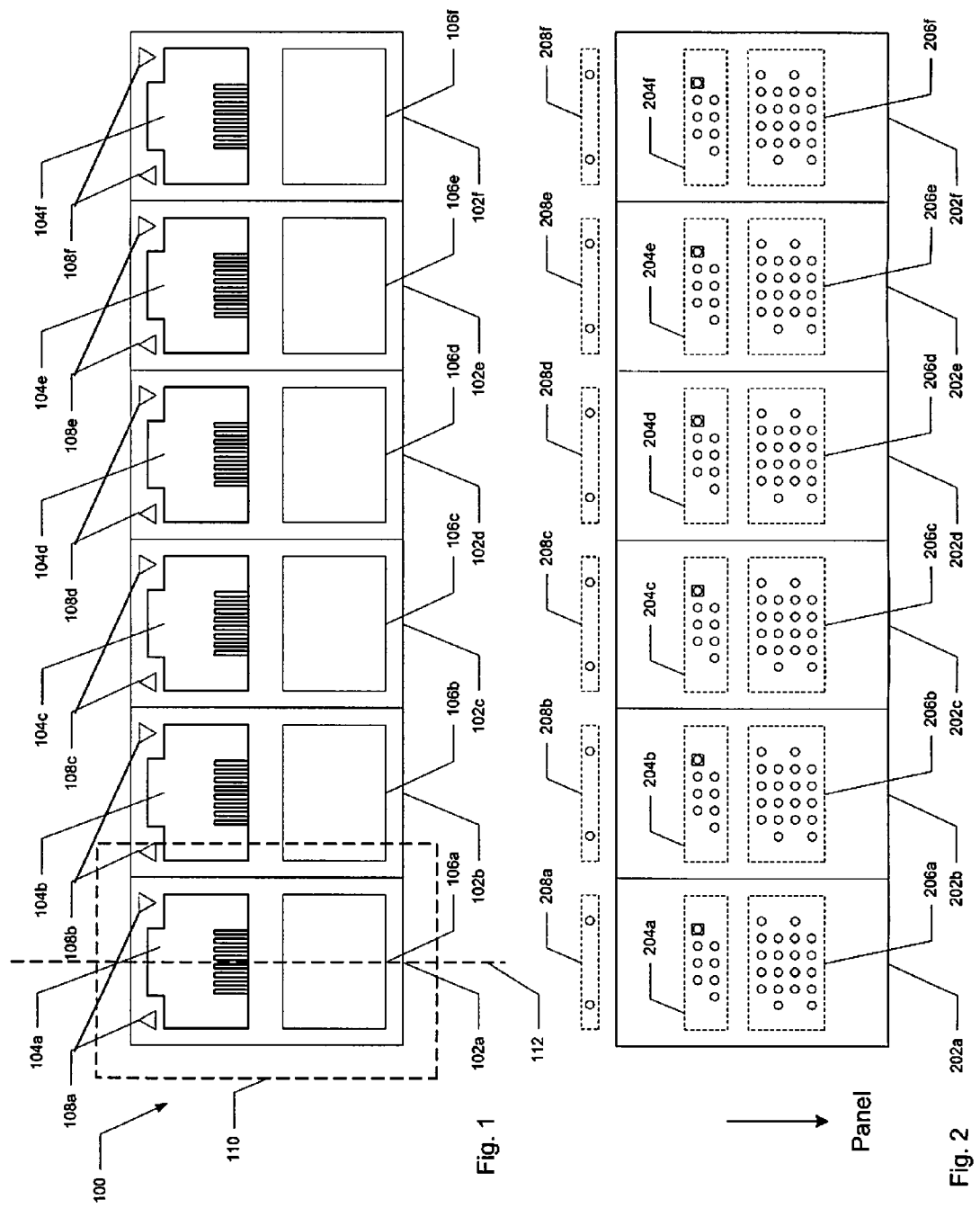

NETWORK ELEMENT CONNECTOR ASSEMBLY INCLUDING STACKED CONNECTOR INTERFACES

CROSS-REFERENCE TO RELATED APPLICATIONS

This application is a continuation-in-part of U.S. patent application Ser. No. 10/758,653, entitled, "NETWORK ELEMENT CONNECTOR ASSEMBLY INCLUDING STACKED CONNECTOR INTERFACES", filed Jan. 15, 2004 now U.S. Pat. No. 7,255,488, and naming Earl W. Boone and James W. Edwards III as inventors. This application is assigned to CISCO TECHNOLOGY, INC., the assignee of the present invention, and is hereby incorporated by reference, in its entirety and for all purposes.

BACKGROUND

1. Technical Field

The present invention relates generally to network element connectors and ports and more particularly to a network element connector assembly including stacked connector interfaces.

2. Description of Related Art

In a conventional network element (e.g., a router, switch, host, server, client, network-attached storage device or array, or the like), one or more connection points or "ports" are defined on a mounting surface (e.g., a printed circuit board) for coupling the network element to a physical communications medium via a network connector (e.g., a registered-jack (RJ) plug, a gigabit interface converter (GBIC) connector, a small form factor (SFF) connector, small form factor pluggable (SFP), or the like). Each port includes a connector interface to receive a network connector and its own physical layer protocol circuit or "PHY" for converting data between physical layer and higher layer (e.g., data link layer) formats.

More recently, so-called "auto-media detection" physical layer protocol circuits have been developed which enable a network element to detect the presence and/or availability of multiple interfaces (e.g., network connectors) to one or more physical connection mediums. A port may therefore include a single "auto-media detection PHY" coupled to multiple connector interfaces used, for example in a failover/recovery configuration. In order to reduce the mounting surface space or "footprint" occupied by a network element connector assembly (e.g., where auto-media detection PHYs are used in conjunction with multiple connector interfaces or where port and/or connector interface densities are high) a number of "stacked" network element connector assemblies have been implemented in which two or more connector interfaces of the same type (e.g., RJ, SFP, GBIC, or the like) are arranged in a stacked or vertically-aligned relationship with one another with respect to a mounting surface or substrate.

One existing network element connector assembly includes a stacked set of identical fixed connector interfaces (e.g., RJ-45 interfaces or receptacles) coupled to a mounting surface. While the described assembly enables a greater number of connector interfaces to be provided within the same mounting surface footprint and is relatively inexpensive to implement, it provides no flexibility in the type of connector interface made available. Another existing network element connector assembly includes a stacked cage assembly or subassembly having a number of stacked apertures to receive removable or "pluggable" connector interface modules of the same type (e.g., SFP transceiver modules). While different transceiver module interfaces (e.g., RJ-45 electrical, LC-type optical, or the like) may be used in conjunction with this type of network element connector assembly to provide greater flexibility in the type of connector interface made available, such removable connector interface modules are relatively expensive and must typically be incorporated into a network element by the end user.

SUMMARY

Disclosed is a network element connector assembly including stacked connector interfaces. Embodiments of the present invention may be used to present a set of stacked connector interfaces to a user each including at least one fixed connector interface and at least one aperture to receive a removable connector interface. According to one embodiment, the described fixed connector is a registered jack 45 (RJ-45) interface or receptacle.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous features and advantages made apparent to those skilled in the art by referencing the accompanying drawings in which:

FIG. 1 illustrates a network element connector assembly including upper connector interfaces each including a fixed connector interface module and lower connector interfaces each including an aperture to receive a removable connector interface module according to an embodiment of the present invention;

FIG. 2 illustrates a contact layout diagram of the network element connector assembly of FIG. 1 according to an embodiment of the present invention;

The use of the same reference symbols in different drawings indicates similar or identical items.

DETAILED DESCRIPTION

Figures 3, 4:
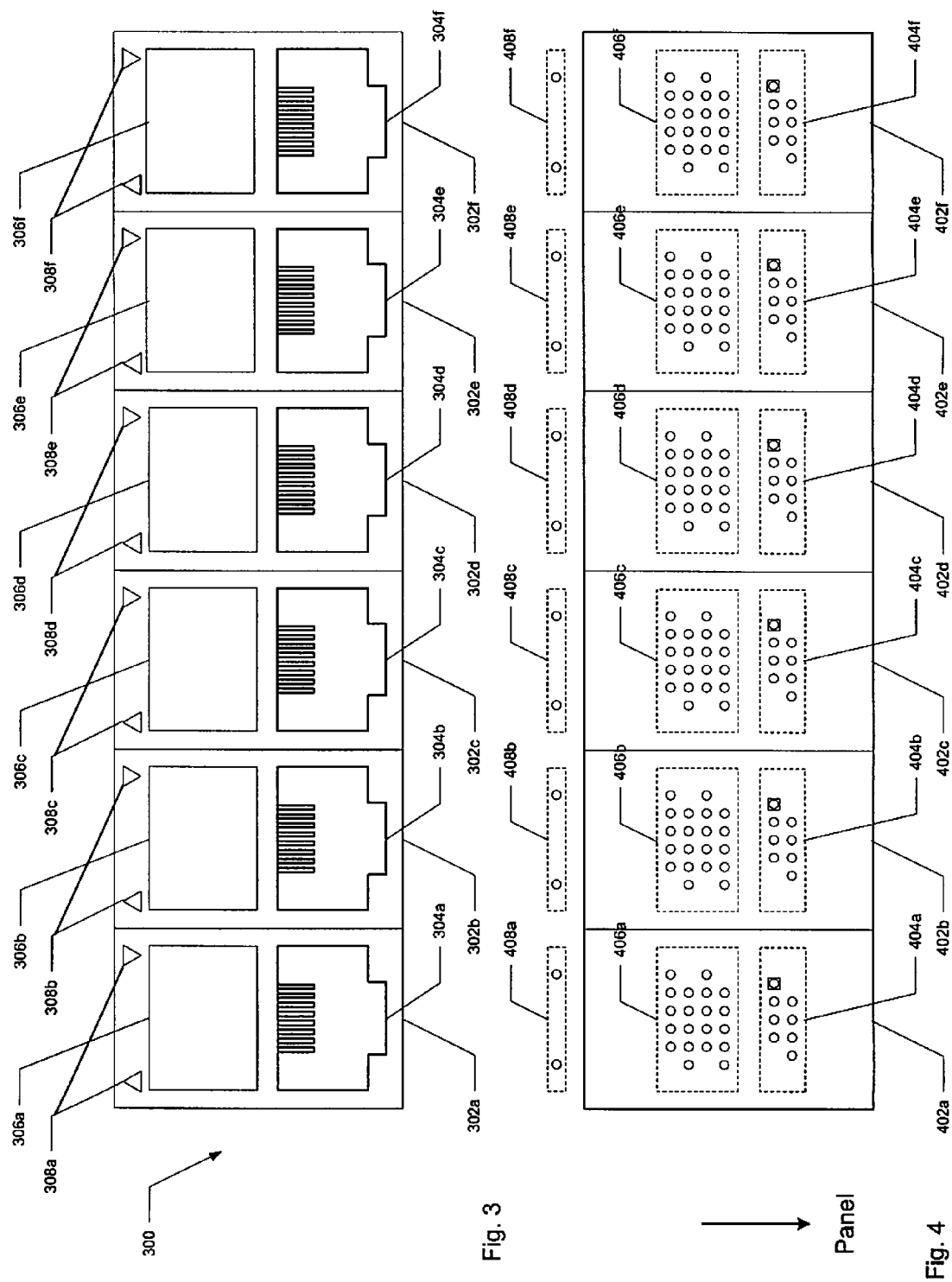
FIG. 3 illustrates a network element connector assembly including lower connector interfaces each including a fixed connector interface module and upper connector interfaces each including an aperture to receive a removable connector interface module according to an embodiment of the present invention.
FIG. 4 illustrates a contact layout diagram of the network element connector assembly of FIG. 3 according to an embodiment of the present invention.

Although the present invention has been described in connection with one or more specific embodiments, the invention is not intended to be limited to the specific forms set forth herein. On the contrary, it is intended to cover such alternatives, modifications, and equivalents as can be reasonably included within the scope of the invention as defined by the appended claims.

In the following detailed description, numerous specific details such as specific orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

According to one embodiment, an apparatus is provided which includes a first connector interface to couple a first network connector with a mounting surface and a second connector interface to couple a second network connector with the mounting surface, where the first connector interface and second connector interface are vertically aligned with one another with respect to the mounting surface, the first connector interface includes a fixed connector interface module, and the second connector interface includes an aperture to receive a removable connector interface module.

FIG. 1 illustrates a network element connector assembly including upper connector interfaces each including a fixed connector interface module and lower connector interfaces each including an aperture to receive a removable connector interface module according to an embodiment of the present invention. The NE connector assembly 100 depicted in FIG. 1 includes a plurality of network element ports 102a-102f each including a corresponding upper connector interface 104, a lower connector interface 106, and one or more visual indicators 108 to indicate which of the upper and lower connector interfaces is active (i.e., transmitting and/or receiving signals, physically coupled to a connector, physically coupled to a connector which is available to transmit and/or receive signals, physically coupled to a connector which is transmitting and/or receiving signals, or the like) within that network element port.

In the embodiment of FIG. 1, each upper connector interface includes a fixed connector interface module (e.g., an RJ-45 interface or receptacle) and each lower connector interface includes an aperture to receive a removable connector interface module (e.g., an SFP transceiver module). In an alternative embodiment of the present invention, one or more of lower connector interfaces 106a-106f may include a cage subassembly and/or a transceiver interface (e.g., an SFP transceiver module interface including a housing, one or more mounting surface contacts, and transceiver module contacts). Although in the embodiment of FIG. 1, each of network element ports 102a-102f includes a corresponding upper connector interface 104 and lower connector interface 106, in alternative embodiments of the present invention each upper connector interface 104 and lower connector interface 106 may be associated with an individual port.

While a particular number of network element ports have been illustrated in the embodiment of FIG. 1, embodiments of the present invention may be implemented with any number of NE ports. Similarly, although a particular orientation of each of upper connector interfaces 104 and lower connector interfaces 106 has been shown which enables a user to easily mate/insert and un-mate/remove associated connectors, no particular orientation of connector interfaces is required. According to one embodiment of the present invention, a connector-receiving plane 110 and a connector-insertion plane is defined for each network element port 102 or portion of the connector assembly. Upper connector interfaces 104 and lower connector interfaces 106 are provided which are substantially adjacent to one another along the line(s) defined by the intersection(s) of the connector-receiving and connector-insertion plane(s) of each port.

In the embodiment of FIG. 1, each of upper connector interfaces 104a-104f includes a registered jack 45 (RJ-45) interface (i.e., an RJ-45 receptacle). An RJ-45 interface is a keyed or unkeyed single-line jack for digital transmission over twisted or untwisted phone wire including eight electrical contacts (e.g., pins or positions). In alternative embodiments of the present invention, other types of registered jack electrical connector interfaces may be implemented (e.g., RJ-11, RJ-14, or the like).

According to one embodiment, a small form factor pluggable (SFP) transceiver module including an LC-type interface and separate optical transmit and receive contacts is removably incorporated into each of lower connector interfaces 106a-106f. In alternative embodiments of the present invention, SFP transceiver modules including other interfaces (e.g., VF-45, MT-RJ, GBIC, or the like) or any combination of the described interfaces may be used.

In the embodiment of FIG. 1, visual indicators 108 are used to indicate to a user which of the lower and upper connector interfaces is active at a given time. In the depicted embodiment, a directionally-shaped visual indicator (e.g., a visual indicator having a directional shape such as an arrow, triangle, teardrop, or the like) is provided at each network element port for each associated network connector interface. According to one embodiment of the present invention, when an upper connector interface 104a is active within network element port 102a, an upward-directed visual indicator 108 is illuminated and when a lower connector interface 106a is active within network element port 102a, a downward-directed visual indicator 108 is illuminated. In alternative embodiments of the present invention, however, a greater or lesser number of visual indicators 108 and non-directionally-shaped visual indicators 108 can be provided. Similarly, visual indicators 108 do not have to be positioned as shown with respect to network element ports 102 but may be positioned anywhere on an associated network element so long as their position does not prevent their use in indicating the activity of their associated connector interfaces to a user. Visual indicators 108 may include light pipes, light-emitting diodes (LEDs), or the like and their illumination can be controlled and/or provided by an associated PHY or other network element component.

FIG. 2 illustrates a contact layout diagram of the network element connector assembly of FIG. 1 according to an embodiment of the present invention. In the illustrated embodiment, a footprint 202a-202f is depicted corresponding to each of network element ports 102a-102f. One or more groupings of contacts (e.g., lower connector interface contact groups 206a-206f and upper connector interface contact groups 204a-204f) are provided within each corresponding footprint 202a-202f and positioned as shown with respect to a network element front panel. In the illustrated embodiment of FIG. 2, a visual indicator contact group 208a-208f is additionally provided outside each of the network element port footprints as shown.

In alternative embodiments of the present invention, visual indicator contact groups 208a-208f may be integrated within footprints 202a-202f and an associated network element connector assembly housing (not illustrated). In the illustrated embodiment each contact within contact groups 204, 206, and 208 includes an electrical or optical signal contact, however additional contacts (e.g., alignment contacts or the like) may be provided in alternative embodiments. Each contact within contact groups 204, 206, and 208 may be of any of a variety of known contact types, (e.g., press-fit, surface mount, conventional soldering, ball-grid array, or the like).

FIG. 3 illustrates a network element connector assembly including lower connector interfaces each including a fixed connector interface module and upper connector interfaces each including an aperture to receive a removable connector interface module according to an embodiment of the present invention. In an alternative embodiment of the present invention, one or more of upper connector interfaces 306a-306f may include a cage subassembly and/or a transceiver interface (e.g., an SFP transceiver module interface including a housing, one or more mounting surface contacts, and transceiver module contacts). The NE connector assembly 300 depicted in FIG. 3 includes a plurality of network element ports 302a-302f each including a corresponding upper connector interface 306, a lower connector interface 304, and one or more visual indicators 308 to indicate which of the upper and lower connector interfaces is active (i.e., transmitting and/or receiving signals, physically coupled to a connector, physically coupled to a connector which is available to transmit and/or receive signals, physically coupled to a connector which is transmitting and/or receiving signals, or the like) within that network element port.

While a particular number of network element ports have been illustrated in the embodiment of FIG. 3, embodiments of the present invention may be implemented with any number of NE ports. Similarly, although a particular orientation of each of lower connector interfaces 304 and upper connector interfaces 306 has been shown which enables a user to easily mate/insert and un-mate/remove associated connectors, no particular orientation of connector interfaces is required. In the embodiment of FIG. 3, each of lower connector interfaces 304a-304f includes a registered jack 45 (RJ-45) interface (i.e., an RJ-45 receptacle). An RJ-45 interface is a keyed or unkeyed single-line jack for digital transmission over twisted or untwisted phone wire including eight electrical contacts (e.g., pins or positions). In alternative embodiments of the present invention, other types of registered jack electrical connector interfaces can be implemented (e.g., RJ-11, RJ-14, or the like).

According to one embodiment, a small form factor pluggable (SFP) transceiver module including an LC-type interface and separate optical transmit and receive contacts is removably incorporated into each of upper connector interfaces 306a-306f. In alternative embodiments of the present invention, SFP transceiver modules including other interfaces (e.g., VF-45, MT-RJ, GBIC, or the like) or any combination of the described interfaces may be used.

FIG. 4 illustrates a contact layout diagram of the network element connector assembly of FIG. 3 according to an embodiment of the present invention. In the illustrated embodiment, a footprint 402a-402f is depicted corresponding to each of network element ports 302a-302f. One or more groupings of contacts (e.g., upper connector interface contact groups 406a-406f and lower connector interface contact groups 404a-404f) are provided within each corresponding footprint 402a-402f positioned in order as shown with respect to a network element front panel. In the illustrated embodiment of FIG. 4, a visual indicator contact group 408a-408f is additionally provided outside each of the network element port footprints as shown.

Figure 5:
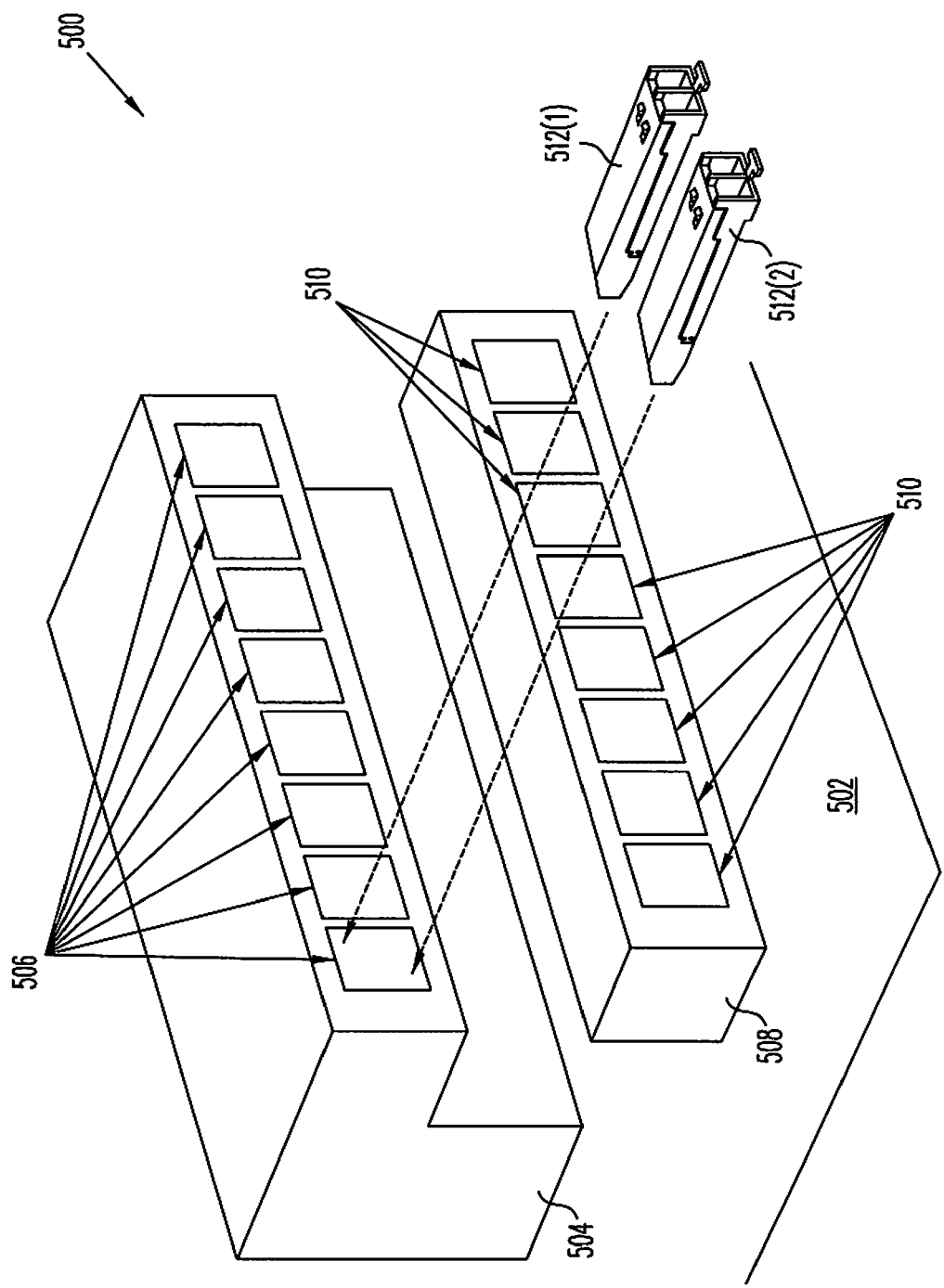
FIG. 5 illustrates a perspective view of a network element connector assembly according to an embodiment of the present invention.

FIG. 5 illustrates a perspective view of a network element connector assembly according to an embodiment of the present invention. In the illustrated embodiment, a network element connector assembly 500 is provided for coupling to a mounting surface 502 (e.g., a printed circuit board or card within a network element) including an upper connector interface portion and a lower connector interface portion as shown.

Upper connector interface portion of the illustrated embodiment includes a housing 504 (e.g., a plastic or dielectric material housing, an electro-magnetic interference (EMI) shield, a cage subassembly, or the like) having a plurality of apertures 506 therein defining a plurality of connector-receiving cavities in or upon which fixed or removable connector interface modules 512 may be provided. In one embodiment, 512(1) is a an SFP transceiver module including, for example, an LC-type interface. Module 512(1) may be removed and replaced with SFP transceiver module 512(2), including, for example, an MT-RJ type interface. Lower connector interface portion of the illustrated embodiment similarly includes a housing 508 having a plurality of apertures 510 therein defining a plurality of connector-receiving cavities in or upon which corresponding fixed or removable connector interface modules may be provided.

While network element connector assembly 500 of the embodiment of FIG. 5 includes separate upper and lower connector interface portions and corresponding housings 504 and 508, in one or more embodiments of the present invention a unified network element connector assembly having a single housing may be implemented. Similarly, although apertures 506 and 510 have been depicted as immediately adjacent to one another following the assembly of the upper connector interface and lower connector interface portions of network element connector assembly 500, in alternative embodiments of the present invention other elements (e.g., other connector interfaces) may be disposed there between.

Figure 6:
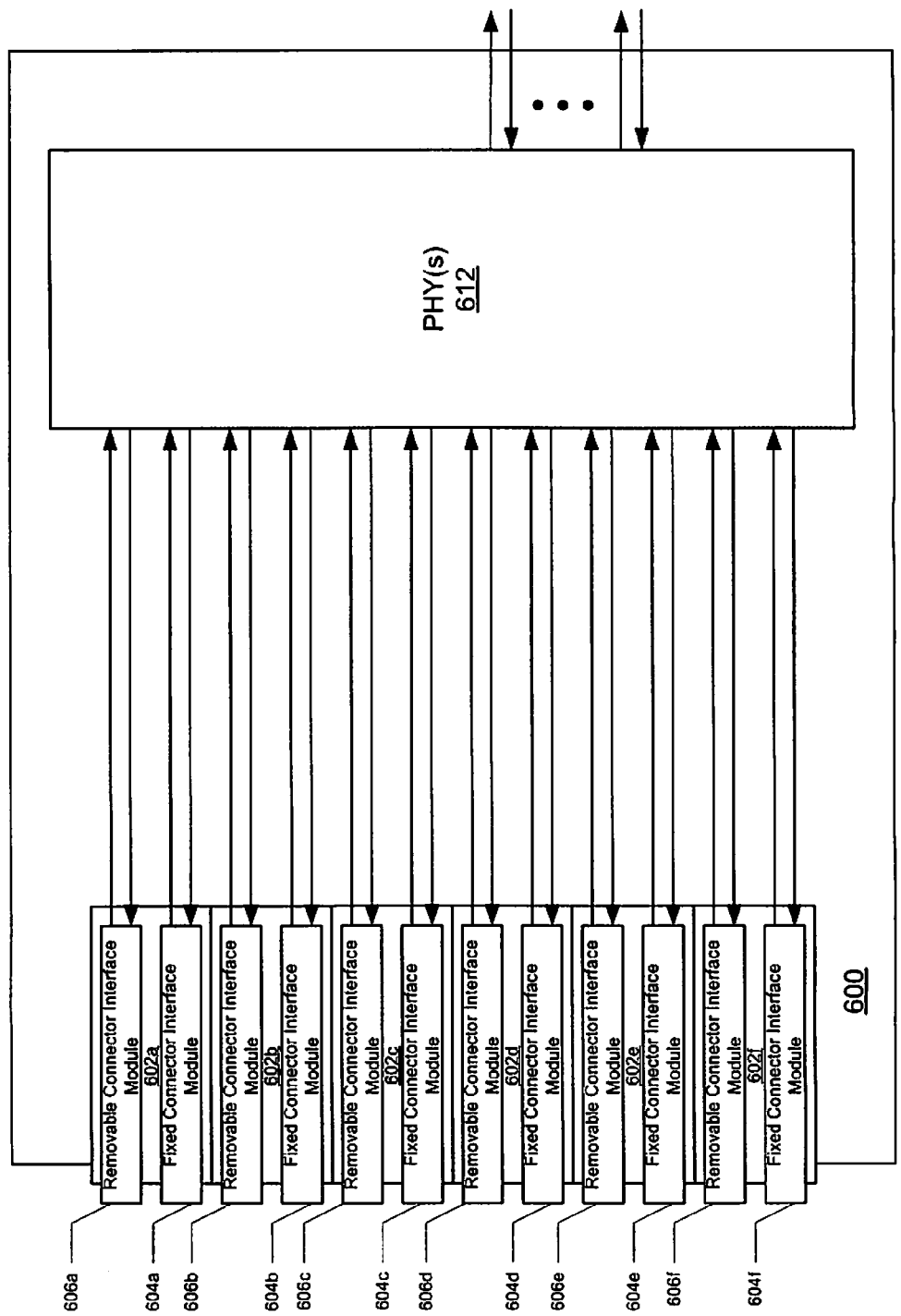
FIG. 6 illustrates a block diagram of a portion of a network element including a network element connector assembly according to an embodiment of the present invention.

FIG. 6 illustrates a functional block diagram of a portion of a network element including a network element connector assembly according to an embodiment of the present invention. A mounting surface 600 of the illustrated network element embodiment includes a plurality of network element ports 602a-602f each including a removable connector interface module 606 and a fixed connector interface module 604, and one or more physical layer protocol circuits 612 (e.g., one or more auto-media detection PHYs) coupled together as shown. According to one embodiment of the present invention, removable connector interface modules 606 each comprise a transceiver (not illustrated) and fixed connector interface modules 604 each comprise an electrical connector interface and a magnetics circuit (not illustrated) including one or more magnetics components (e.g., transformers, inductors, or the like) used to electrically isolate a corresponding fixed connector interface from the remainder of the network element. While removable connector interface modules 606 and fixed connector interface modules 604 have been depicted next to one another within the embodiment of FIG. 6 for clarity of presentation, in one embodiment of the present invention some or all of removable connector interface modules 606 and fixed connector interface modules 604 may be layered vertically.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing detailed description has set forth various embodiments of the present invention via the use of block diagrams, flowcharts, and examples. It will be understood by those within the art that each block diagram component, operation and/or component illustrated by the use of examples can be implemented, individually and/or collectively, by a wide range of hardware, software, firmware, or any combination thereof.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

What is claimed is:

1. An apparatus comprising:
   a first connector interface configured to couple a first network connector with a mounting surface; and
   a second connector interface configured to couple a second network connector with said mounting surface, wherein
      said first connector interface and said second connector interface are vertically aligned with one another with respect to said mounting surface,
      said first connector interface comprises a non-removable connector interface module,
      said non-removable connector interface module is fixedly coupled to said mounting surface,
      said second connector interface comprises an aperture configured to removably receive a plurality of types of a removable connector interface module, and
      said removable connector interface module is configured to removably receive said second network connector.

2. The apparatus of claim 1, wherein said non-removable connector interface module comprises a registered jack 45 (RJ-45) interface.

3. The apparatus of claim 2, wherein said aperture comprises an aperture to receive a small form factor pluggable (SFP) transceiver module.

4. The apparatus of claim 3, wherein said second connector interface further comprises an SFP transceiver module interface.

5. The apparatus of claim 4, wherein said SFP transceiver module interface comprises:
   a transceiver module contact configured to couple said SFP transceiver module interface to an SFP transceiver module; and
   a mounting surface contact configured to couple said SFP transceiver module interface to said mounting surface.

6. The apparatus of claim 2, wherein said second connector interface further comprises a small form factor pluggable (SFP) transceiver module in communication with said aperture.

7. The apparatus of claim 6, wherein said SFP transceiver module comprises an optical connector interface.

8. The apparatus of claim 2, wherein said aperture comprises an aperture to receive a gigabit interface converter (GBIC) transceiver module.

9. The apparatus of claim 2, further comprising:
   a visual indicator to indicate which of said first connector interface and said second connector interface is active.

10. The apparatus of claim 9,
   wherein said a visual indicator comprises at least one of a light emitting diode and a light pipe.

11. The apparatus of claim 1,
   wherein said mounting surface comprises a printed circuit board.

12. An apparatus comprising:
   a network element connector assembly;
   a first connector interface disposed within said network element connector assembly; and
   a second connector interface disposed within said network element connector assembly, wherein
      said first connector interface comprises a non-removable connector interface module,
      said non-removable connector interface module is fixedly disposed to said network element connector assembly,
      said second connector interface comprises an aperture configured to removably receive a plurality of types of a removable connector interface module, and
      said removable connector interface module is configured to receive a network connector, and
      said first connector interface and said second connector interface are substantially adjacent to one another along a line defined by an intersection of a connector-receiving plane of said network element connector assembly and a connector-insertion plane of said network element connector assembly.

13. The apparatus of claim 12, wherein said non-removable connector interface module comprises a registered jack 45 (RJ-45) interface.

14. The apparatus of claim 13, wherein said aperture comprises an aperture to receive a small form factor pluggable (SFP) transceiver module.

15. The apparatus of claim 14, wherein said second connector interface further comprises an SFP transceiver module interface.

16. The apparatus of claim 15, wherein said SFP transceiver module interface comprises:
   a transceiver module contact configured to couple said SFP transceiver module interface to an SFP transceiver module; and
   a mounting surface contact configured to couple said SFP transceiver module interface to a mounting surface.

17. The apparatus of claim 13, wherein said second connector interface further comprises a small form factor pluggable (SFP) transceiver module in communication with said aperture.

18. The apparatus of claim 17, wherein said SFP transceiver module comprises an optical connector interface.

19. The apparatus of claim 13, wherein said aperture comprises an aperture to receive a gigabit interface converter (GBIC) transceiver module.

20. The apparatus of claim 13, further comprising:
a visual indicator coupled to said network element connector assembly to indicate which of said first connector interface and said second connector interface is active.

21. The apparatus of claim 20,
wherein said a visual indicator comprises at least one of a light emitting diode and a light pipe.

22. A method comprising:
coupling a first connector interface to a mounting surface; and
coupling a second connector interface to said mounting surface such that said first connector interface and said second connector interface are vertically aligned with one another with respect to said mounting surface, wherein
said first connector interface comprises a non-removable connector interface module,
said non-removable connector interface module is fixedly coupled to said mounting surface, and
said second connector interface comprises an aperture to removably receive a plurality of types of a removable connector interface module.

23. The method of claim 22, further comprising:
receiving a first network connector using said first connector interface.

24. The method of claim 23, wherein
said first connector interface comprises a registered jack 45 (RJ-45) receptacle, and
said receiving said first network connector using said first connector interface comprises
receiving a registered jack 45 (RJ-45) plug.

25. The method of claim 24, further comprising:
receiving a second network connector using said second connector interface.

26. The method of claim 25, wherein
said second connector interface comprises a small form factor pluggable (SFP) transceiver module in communication with said aperture, and
said receiving said second network connector using said second connector interface comprises
receiving an SFP connector.

27. An apparatus comprising:
means for coupling a first network connector to a mounting surface, said means for coupling said first network connector comprising means for receiving said first network connector; and
means for coupling a plurality of types of a second network connector to said mounting surface, said means for coupling said second network connector comprising
means for receiving said second network connector, wherein
said means for receiving said first network connector and said means for receiving said second network connector are vertically aligned with one another with respect to said mounting surface,
said means for receiving said first network connector is non-removably fixed to said mounting surface, and
said means for receiving said second network connector is removably coupled to said mounting surface and is configured to be removably coupled to the second network connector.

28. The apparatus of claim 27, wherein said means for receiving said first network connector comprises:
means for receiving a registered jack 45 (RJ-45) plug.

29. The apparatus of claim 28, wherein said means for receiving said second network connector comprises:
means for receiving a small form factor pluggable (SFP) connector.

30. The apparatus of claim 28, wherein said means for receiving said second network connector comprises:
means for receiving a gigabit interface converter (GBIC) connector.

31. The apparatus of claim 28, further comprising:
means for visually indicating which of said means for receiving said first network connector and said means for receiving said second network connector is active.

\* \* \* \* \*